(No Model.)

J. E. DINGMAN & S. KLINGIN.
JACK SPOOL.

No. 578,977. Patented Mar. 16, 1897.

Witnesses
H. D. Hallock
S. H. Williamson

By their Attorney

Inventors
James E. Dingman
Sherman Klingin
Geo. H. Holgate

UNITED STATES PATENT OFFICE.

JAMES E. DINGMAN AND SHERMAN KLINGIN, OF LITTLE FALLS, NEW YORK.

JACK-SPOOL.

SPECIFICATION forming part of Letters Patent No. 578,977, dated March 16, 1897.

Application filed July 3, 1896. Serial No. 598,051. (No model.)

*To all whom it may concern:*

Be it known that we, JAMES E. DINGMAN and SHERMAN KLINGIN, citizens of the United States, residing at Little Falls, in the county of Herkimer and State of New York, have invented certain new and useful Improvements in Jack-Spools, of which the following is a specification.

Our invention relates to a new and useful improvement in jack-spools, and has for its object to so construct a device of this description that the heads may be secured upon the shaft in such manner that they cannot be removed or become loose by accident or by the wear incident to their use, thereby producing a more durable spool, which will save much of the loss in material and time which has heretofore been occasioned by the breaking down of the spool when in use.

With these ends in view our invention consists in the details of construction and combination of elements hereinafter set forth and then specifically designated by the claims.

In order that those skilled in the art to which this invention appertains may understand how to make and use the same, we will describe its construction and operation in detail, referring to the accompanying drawings forming a part of this specification, in which—

Figure 1:
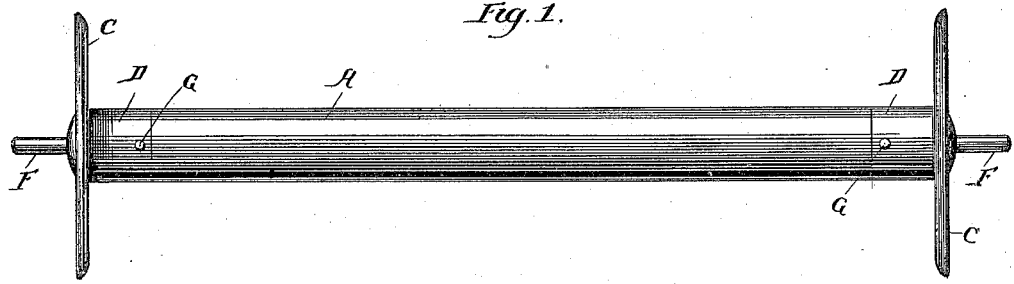
Figure 2:
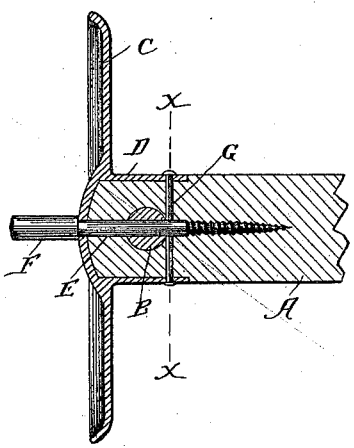
Figure 3:
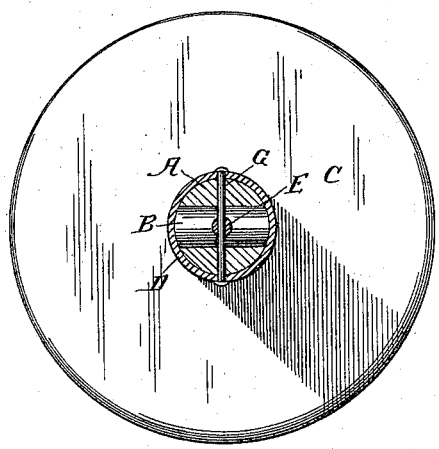

Figure 1 is a side view of our improvement; Fig. 2, a detailed section of one end thereof, showing one of the heads and means for attaching the same to the shaft; and Fig. 3, a section at the line *x x* of Fig. 2.

Referring in detail to the drawings, A represents the shaft, which may be made of any suitable material, preferably wood, and having passed through each end thereof a hard-wood plug B. The heads C are circular and slightly cup-shaped, so that their inner sides may afford guidance for the rope or yarn run upon the spool, and these heads have formed therewith the sockets or ferrules D, the outer diameters of which are the same as the diameters of the shaft. In securing the heads upon the shaft the ends of the latter are turned down so as to fit within the sockets, as clearly shown in Fig. 2, and when the heads are placed upon the shaft the pin E, a portion of which is threaded, is passed through a suitable opening in each of the central openings in each of the heads and threaded into the shaft, the spindle F projecting from the head to serve as a trunnion upon which one end of the spool may turn.

To prevent the withdrawal of the pin or the head, a rivet G is passed through the ferrule or socket and through a suitable hole in said pin just in the rear of the hard-wood plug B, so that neither the pin can be turned to back it out of the shaft nor the head drawn from off the end thereof, the plug serving the twofold purpose of adding stability to the rivet and preventing the loosening of the pin within the shaft by sidewise strains.

A spool constructed in accordance with our improvement will have little or no tendency to wear, and consequently the head and spindles cannot be withdrawn accidentally, and this is of great advantage in that it prevents the loss which has heretofore been occasioned by the breaking down of the spool when in use. One of the principal advantages of our improvement is that a perfect spool is produced at little or no increase of cost over the old method of manufacturing said spools. It is obvious that the heads may be made of iron or any other suitable material and either cast or forged.

Having thus fully described our invention, what we claim as new and useful is—

1. A jack-spool consisting of two heads each provided with sockets for fitting over the ends of said shaft, threaded pins adapted to pass through said heads and be screwed into the shaft, rivets G passed through the ferrules and pins, and hard-wood plugs set in the ends of said shaft in front of said rivets, substantially as and for the purpose set forth.

2. In combination with the shaft of a jack-spool, two heads of circular shape, ferrules formed with said heads adapted to fit over the ends of the shaft, threaded pins adapted to pass through the central openings of said heads and be threaded into said shaft, spindles F formed with said pins, rivets G, by means of which the heads, shaft and pins are secured in their proper relative positions, and a plug B of hard wood placed in front of each of the rivets, substantially as shown and described.

In testimony whereof we have hereunto affixed our signatures in the presence of two subscribing witnesses.

JAMES E. DINGMAN.
SHERMAN KLINGIN.

Witnesses:
S. S. WILLIAMSON,
JAMES J. CASLEN.